UNITED STATES PATENT OFFICE.

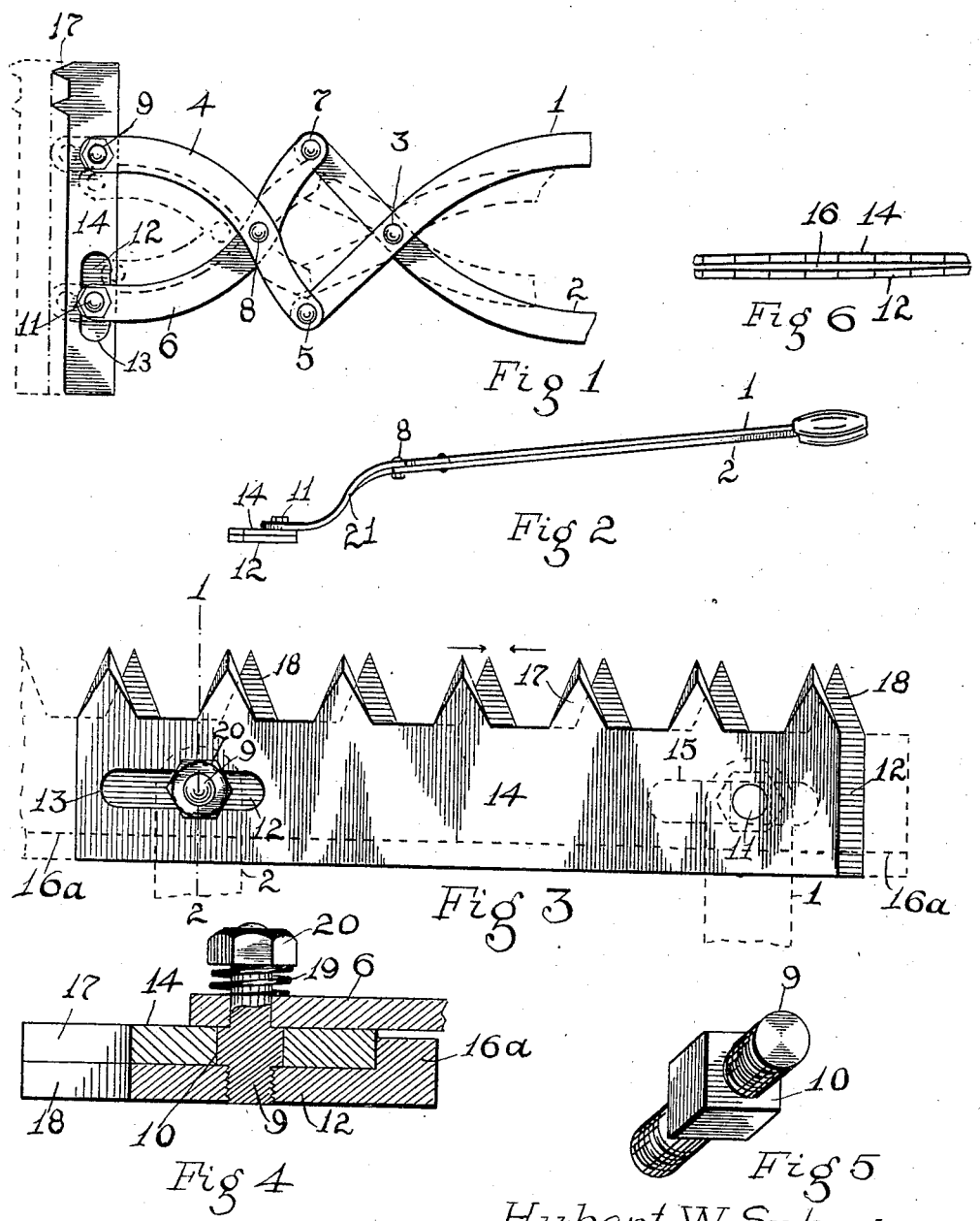

HUBERT W. SYKES, OF NORFOLK, VIRGINIA.

HEDGE-TRIMMER.

No. 856,312.     Specification of Letters Patent.     Patented June 11, 1907.

Application filed October 26, 1906. Serial No. 340,712.

*To all whom it may concern:*

Be it known that I, HUBERT W. SYKES, a citizen of the United States, residing at Norfolk, in the county of Norfolk and State of Virginia, have invented certain new and useful Improvements in Hedge-Trimmers, of which the following is a specification.

My invention relates to hedge trimmers.

The object of the invention is to provide a hedge clipper or trimmer which will be powerful and durable.

Further objects and advantages will be more fully described herein and specifically pointed out in the claims recourse being had to the accompanying drawing forming a part of this specification in which—

Figure 1 is a plan of the trimmer. Fig. 2 is a side elevation of the same. Fig. 3 is a plan of the cutting blades. Fig. 4 is a cross section taken in the line 1—2 in Fig. 3. Fig. 5 is a perspective view of one of the blade clamping stud bolts, and Fig. 6 is an edge view of the blades showing the concave inner surface of each blade produced by slightly bending them.

In the drawing like reference numerals indicate similar parts in all the views—

1 and 2 are the curved handle members which when viewed as shown in Fig. 2 assume an angle with the plane of the blades in order to prevent the operators hand from coming in contact with the hedge when it is used, for example when trimming boxwood hedges some of which are three or four feet wide.

3 is the joint or pivot for the handle members, 4 being a curved link connecting the handle member 1 by the pivot 5 with the upper cutting blade. 6 is another curved link connected to the handle member 2 and to the lower cutting blade, the joint between the two being at 7.

8 is a joint between the two curved members 4 and 6 as shown.

9 is a stud bolt having a square shoulder 10 upon it two of its surfaces adapted to permit the blade 14 to slide upon them when in their slotted portions. The screw bolt 9 is secured to the blade 12 and passes through the slot 13 of the blade 14; the bolt 11 is also provided with a square shoulder, being fixed in the top blade 14 and passes through the slot 15 in the blade 12 exactly the same as the bolt or screw 9. The members 4 and 6 are held to the blade by nuts as shown in Figs. 1 and 3. The blades 12 and 14 are slightly bent from end to end so as to form a space 16 produced by the concave surfaces thus reducing friction and forming a spring action when the blades are firmly pressed together.

$16^a$ is a flange on the lower blade but may be upon the upper blade its object being to guide the blades and prevent them from getting out of alinement.

17 and 18 are bevel saw teeth of the upper and lower blades, respectively.

19 (Fig. 4) is a spring surrounding the bolts 9 and 11 and is placed into compression by the nuts 20 which holds the two blades firmly together. The offset portion shown in Fig. 2 at 21 permits the blades to be below the operators hands when using the device. As shown both blades are movable when the trimmer is in use the slots 13 and 15 limiting their stroke, the blades have also a forward and backward motion when in action due to the lazy tong arrangement shown in Fig. 1, the forward movement being indicated by dotted lines.

Having described my invention and what I claim and desire to secure by Letters Patent is:—

1. A hedge trimmer comprising blades having a slot near one end of the same, a bolt having a square shoulder fastened to each blade to guide the other, a flange on one of the blades, lazy tong levers attached to the blades, and means for advancing and retracting the blades when said blades are reciprocated.

2. A hedge trimmer comprising double reciprocating toothed cutting blades, a guide flange on one of the blades, said blades being slightly bent to form concave surfaces, spring pressed clamping means acting on the blades, and a lazy tong adapted to actuate said blades.

3. A hedge trimmer comprising a pair of arched blades having a slot at each end a flange on one of the blades, a square shouldered bolt adapted to move with the blades in said slot, spring pressed clamping means acting on the blades, handles for the blades, disposed at an angle with the plane of the blades, and a series of curved power multiplying levers connecting said handle and the blades.

In testimony whereof I have hereunto affixed my signature in the presence of two witnesses.

HUBERT W. SYKES.

Witnesses:
JOHN A. BAECHER,
WALTER B. BURROW.